3,756,946
SEWAGE TREATMENT PROCESS
Gilbert V. Levin, Chevy Chase, and George J. Topol, Silver Spring, Md., assignors to Biospherics Incorporated, Rockville, Md.
Filed June 13, 1972, Ser. No. 262,376
Int. Cl. C02c 1/06
U.S. Cl. 210—6
8 Claims

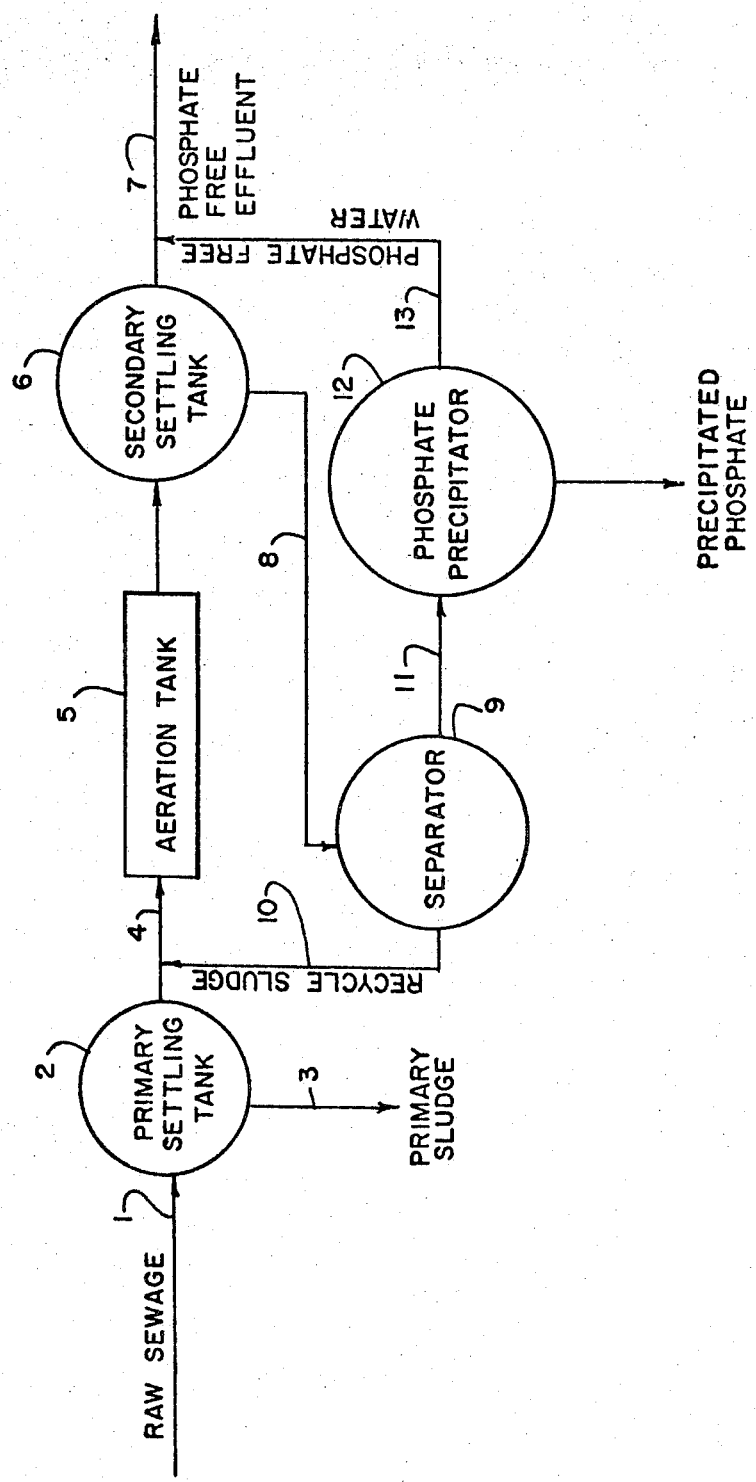

ABSTRACT OF THE DISCLOSURE

There is disclosed an activated sludge sewage treatment process which comprises mixing influent sewage material with activated sludge to provide a mixed liquor. The mixed liquor is passed to an aeration zone wherein it is aerated to reduce the BOD content thereof and to cause the microorganisms present to take up phosphate. The mixed liquor is then passed to a settling zone containing an anaerobic layer of sludge. In the settling zone, phosphate-enriched sludge, in which the phosphate is present in the cells of the organisms, settles into the anaerobic layer of sludge and a substantially phosphate-free effluent is removed from above the layer of sludge. The sludge is maintained under anaerobic conditions in the sludge layer of the settling zone for a time sufficient to cause the organisms in the sludge to release phosphate to the liquid phase of the sludge. Sludge containing soluble phosphate in the liquid phase thereof is removed from the settling zone. The sludge is then treated to separate a phosphate-enriched aqueous phase and to provide a sludge having a higher concentration of solids and a lesser concentration of phosphate. The concentrated sludge is recycled for mixing with influent sewage material in the activated sludge sewage treatment process.

---

This invention relates to a process for treating raw or treated sewage to obtain a substantially phosphorous-free effluent which is returned to natural water resources.

In the conventional activated sludge system in use today, sewage is subjected to the usual screening and preliminary sedimentation procedures, then mixed with activated sludge recycled from a settling tank to form a mixed liquor and the mixed liquor is subjected to aeration. During aeration of the mixed liquor, the organisms present cause the aerobic decomposition of solids and a high degree of BOD removal is achieved.

Phosphates, which are present in organic wastes and detergents, escape conventional sewage treatment processes and are released with the effluent into natural water resources, e.g., lakes, rivers and streams. These phosphates result in over fertilization or eutrophication of waters causing unsightly algal blooms and serious pollution problems.

It is known that aeration of the mixed liquor in an activated sludge sewage treatment process initially causes the microorganisms present to take up phosphate. U.S. Pat. No. 3,236,766 discloses a process which utilizes this phenomenon for removing phosphate from sewage. According to the process disclosed in that patent, the pH of raw sewage is adjusted, if necessary, to maintain a range of from about 6.2 to about 8.5, the sewage is mixed with activated sludge to form a mixed liquor, the mixed liquor is aerated to maintain a dissolved oxygen content of at least 0.3 mg. per liter in the mixed liquor and a phosphate-enriched sludge, in which the phosphate is present in the cells of the organisms, is separated from the mixed liquor in a settling zone to provide a substantially phosphate-free effluent. The phosphate-enriched sludge in which the phosphate is still present in the cells of the organisms, is passed to a phosphate stripping and sludge thickening tank wherein it is treated to reduce the phosphate content thereof prior to recycling for mixing with the influent sewage. This is accomplished by maintaining the phosphate-enriched sludge in an anaerobic condition for several hours or at a pH of less than 6.5 for 10 to 20 minutes. The anaerobic condition and the acidic pH induce considerable quantities of intracellular phosphate to leak out of the sludge into a liquid phase.

It is an object of this invention to provide an improved process for reducing the phosphate content and for promoting a high degree of BOD removal in an activated sludge sewage treatment process.

It is another object of this invention to provide such a process which does not require the use of a separate phosphate stripping and sludge thickening tank.

These and other objects are attained by the practice of this invention which, briefly comprises mixing influent sewage material with activated sludge to provide a mixed liquor. The mixed liquor is passed to an aeration zone wherein it is aerated to reduce the BOD content thereof and to cause the microorganisms present to take up phosphate. The mixed liquor is then passed to a settling zone containing an anaerobic layer of sludge. In the settling zone, phosphate-enriched sludge, in which the phosphate is present in the cells of the organisms, settles into the anaerobic layer of sludge and a substantially phosphate-free effluent is removed from above the layer of sludge. The sludge is maintained under anaerobic conditions in the sludge layer of the settling zone for a time sufficient to cause the organisms in the sludge to release phosphate to the liquid phase of the sludge. Sludge containing soluble phosphate in the liquid phase thereof is removed from the settling zone. The sludge is then treated to separate a phosphate-enriched aqueous phase and to provide a sludge having a higher concentration of solids and a lesser concentration of phosphate. This sludge is recycled for mixing with influent sewage material in the activated sludge sewage treatment process.

The invention is illustrated in the accompanying drawing wherein the figure is a flow diagram of the phosphate removal process of this invention.

A raw sewage influent stream 1 is passed through conventional screening and grit removing units and is optionally subjected to primary settling in a primary settling tank 2 from which primary sludge is removed in line 3. The primary settled sewage is mixed with recycled, activated sludge hereinafter described to form a mixed liquor and is passed by line 4 to the aeration tank 5.

In the aeration tank, the mixed liquor is aerated at a rate sufficient to maintain it aerobic—i.e., so that there is a measurable amount of oxygen present in the mixed liquor—in at least a part of the aeration tank for a period of 1 to 8 hours. During aeration, the bacteria present take up phosphate and consume organic matter present in the sewage. A high degree of BOD removal is obtained during aeration.

After aeration, the mixed liquor is fed into a secondary settling tank 6 containing a layer of sludge, the lower portion of which is anaerobic. In the secondary settling tank 6, phosphate enriched sludge settles and separates from the mixed liquor, leaving a substantially phosphate-free supernatant. This supernatant may be discharged for disposal as effluent or for further treatment in a conventional manner by line 7. The phosphate enriched sludge which separates and settles from the mixed liquor contains a high amount of phosphate present in the cells of the organisms in the sludge. The solid particles in the sludge containing intracellular phosphate settle into the anaerobic layer of sludge in the secondary settling zone 6.

A density gradient exists in the layer of sludge in the settling tank 6, the density of the sludge being greater at the bottom of the sludge layer than at the top. As the solids in the sludge containing intracellular phosphate migrate to the bottom of the sludge layer, because of the anaerobic conditions existing in this portion of the sludge layer, the organisms release phosphate to the liquid phase of the sludge in the form of water soluble phosphate ions. The concentration of soluble phosphate is greatest in the lower portion of the sludge layer.

The sludge moves through the secondary settling tank in a plug flow pattern—i.e., each particle of sludge moves through the tank progressively at substantially the same rate and the residence time of each particle of sludge in the tank is approximately the same. Preferably, the residence time of the sludge in the tank is from 2 to 20 hours.

A secondary sludge is continuously removed from the secondary settling tank 6 by line 8. This sludge comprises an aqueous phase containing soluble phosphate and a phosphate depleted solids phase. The sludge is passed by line 8 to a separator 9, such as a centrifuge or filter, to separate the phosphate enriched aqueous phase and to provide a recycle sludge having a higher concentration of solids and a reduced concentration of phosphate. The separated sludge is passed by line 10 for mixing with the raw sewage which is being fed to the aeration tank 5.

The phosphate enriched aqueous phase obtained from the separator 9 is passed by line 11 to a phosphate precipitator 12. A phosphate precipitant, such as lime, is mixed with the phosphate enriched liquor in the phosphate precipitator 12 to precipitate phosphate.

A phosphate-free supernatant liquor is withdrawn from the phosphate precipitator 12 and passed by line 13 to line 7 wherein it is combined with the phosphate free effluent from the secondary settling tank 6. Optionally, the supernatant from the phosphate precipitator 13, or a portion thereof, may be recycled to the aeration tank 5 and/or to the secondary settling tank 6.

According to this invention, the phosphate releasing operation is conducted in the settling zone which immediately follows the aeration of the mixed liquor. Thus, the time and equipment required to withdraw sludge from this settling zone and send it to a separate anaerobic phosphate stripping zone is eliminated.

The following example illustrates a specific embodiment of this invention:

EXAMPLE

Raw sewage (1 million gallons per day—g.p.d.) containing 100 parts per million (p.p.m.) of solids is mixed with recycle activated sludge. The mixed liquor is fed to an aeration zone and is aerated at a rate of 2 cubic feet of air per gallon of sewage for six hours. The effluent mixed liquor from the aeration zone is fed to a secondary settling tank. Clarified waste liquid which is substantially free of phosphate is discharged to the effluent outflow after chlorination at a rate of 1 million g.p.d. The settled mixture of sludge, which is substantially anaerobic in the lower portion of the tank, contains a very low concentration of soluble phosphate at the top of the layer (about 1 part per million) and the concentration of soluble phosphate increases with the depth of the layer to about 50 parts per million at the bottom of the layer. The conditions existing in the lower part of this tank induce considerable quantities of intracellular phosphate to leak out to the liquid phase. Phosphate enriched sludge comprising an aqueous phase containing soluble phosphate and a phosphate-depleted solids phase is removed from the secondary settling tank at a rate of 100,000 gallons per day. This sludge is passed to a centrifuge to separate a phosphate-enriched aqueous phase and to provide a recycle sludge having a high concentration of solids, and a low concentration of phosphate. The sludge is recycled for mixing with incoming raw sewage and the phosphate enriched aqueous phase is fed into a chemical precipitation tank where lime is added and mixed to form a phosphate precipitate. This process removes more than 80% of the phosphate contained in the raw sewage.

We claim:

1. An activated sludge sewage treatment process comprising mixing influent sewage material with sludge to provide a mixed liquor, aerating said mixed liquor for a time sufficient to reduce the BOD content and to cause the organisms present to take up phosphate, passing the mixed liquor to a settling zone containing an anaerobic layer of sludge, permitting the phosphate enriched sludge portion of said mixed liquor to settle into the anaerobic layer of sludge wherein the anaerobic conditions in the sludge layer of said settling zone cause phosphate to be released to the liquid phase of said sludge in water soluble form, removing a phosphate-depleted supernatant from said zone and removing sludge containing soluble phosphate in the liquid phase thereof from said zone, treating said sludge to separate a phosphate enriched aqueous phase and to provide a sludge having a higher concentration of solids and a lower concentration of phosphate, recycling said sludge having a reduced phosphate content and mixing with said influent sewage material.

2. An activated sludge sewage treatment process as defined in claim 1 wherein said mixed liquor is aerated at a rate sufficient to maintain at least 0.3 mg. of dissolved oxygen per liter of mixed liquor.

3. An activated sludge sewage treatment process as defined in claim 2 wherein the said mixed liquor is aerated for a period of 1 to 8 hours.

4. An activated sludge sewage treatment process as defined in claim 1 wherein the residence time of the sludge in said settling zone is from 2 to 20 hours.

5. An activated sludge sewage treatment process as defined in claim 1 wherein said sludge removed from said settling zone is centrifuged to separate said phosphate enriched aqueous phase.

6. An activated sludge sewage treatment process as defined in claim 1 wherein said sludge removed from said settling zone is filtered to separate said phosphate-enriched aqueous phase.

7. An activated sludge sewage treatment process as defined in claim 1 wherein said sludge removed from said settling zone is gravity thickened to separate said phosphate-enriched aqueous phase.

8. An activated sludge sewage treatment process as defined in claim 1 wherein said sludge removed from said settling zone is microstrained to separate said phosphate-enriched aqueous phase.

References Cited

UNITED STATES PATENTS

| | | | |
|---|---|---|---|
| 3,235,487 | 2/1966 | Westgarth | 210—6 |
| 3,386,910 | 6/1968 | Forrest | 210—5 |
| 3,654,147 | 4/1972 | Levin et al. | 210—6 |
| 3,168,465 | 2/1965 | Kraus et al. | 210—7 |

OTHER REFERENCES

Keefer, C. F., et al.: "Activated Sludge Studies," Sewage and Ind. Wastes, August 1953, vol. 25, pp. 898–908 (P.O.S.L.).

Levin, G. V., et al.: "Metabolic Uptake of Phosphorus by Waste Water Organisms," Jour. WPCF., June 1965, vol. 37, pp. 800–821 (P.O.S.L.).

MICHAEL ROGERS, Primary Examiner

U.S. Cl. X.R.

210—16; 210—73